No. 865,895. PATENTED SEPT. 10, 1907.
S. R. HEWITT.
HINGE.
APPLICATION FILED OCT. 5, 1905.

2 SHEETS—SHEET 1.

Witnesses
Frank B. Hoffman
John F. Byrne

Inventor
S. R. Hewitt

By
Victor J. Evans.
Attorney

THE NORRIS PETERS CO., WASHINGTON, D. C.

No. 865,895. PATENTED SEPT. 10, 1907.
S. R. HEWITT.
HINGE.
APPLICATION FILED OCT. 5, 1905.

2 SHEETS—SHEET 2.

Inventor
S. R. Hewitt

Witnesses
Frank B. Hoffman
John F. Byrne

By
Victor J. Evans
Attorney

UNITED STATES PATENT OFFICE.

SAMUEL REDPATH HEWITT, OF BELFAST, IRELAND.

HINGE.

No. 865,895.  Specification of Letters Patent.  Patented Sept. 10, 1907.

Application filed October 5, 1905. Serial No. 281,554.

*To all whom it may concern:*

Be it known that I, SAMUEL REDPATH HEWITT, a subject of the King of Great Britain, residing at Belfast, Ireland, have invented new and useful Improvements in Hinges, of which the following is a specification.

My invention relates to hinges, and its primary object is to provide a novel and highly useful device of this character which is adapted to be applied in a manner to be concealed from view when the door is closed, and which is adapted to limit the opening movement of the door.

Figure 1:
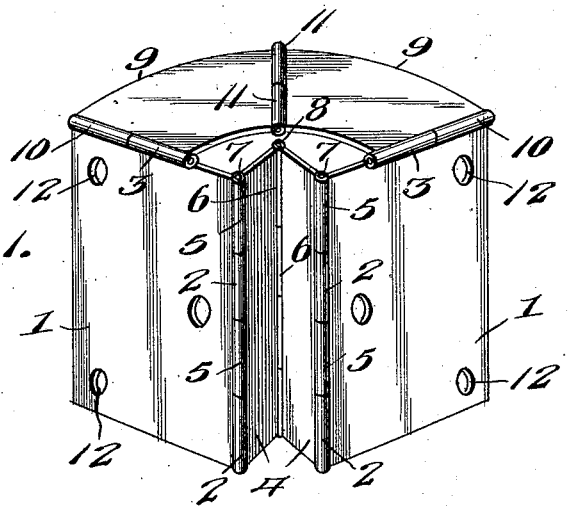
Figure 2:
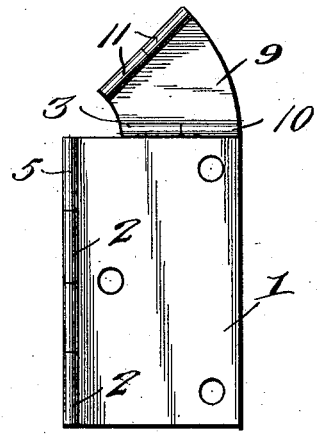
Figure 3:
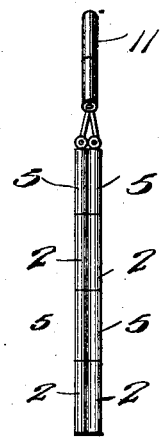
Figure 4:
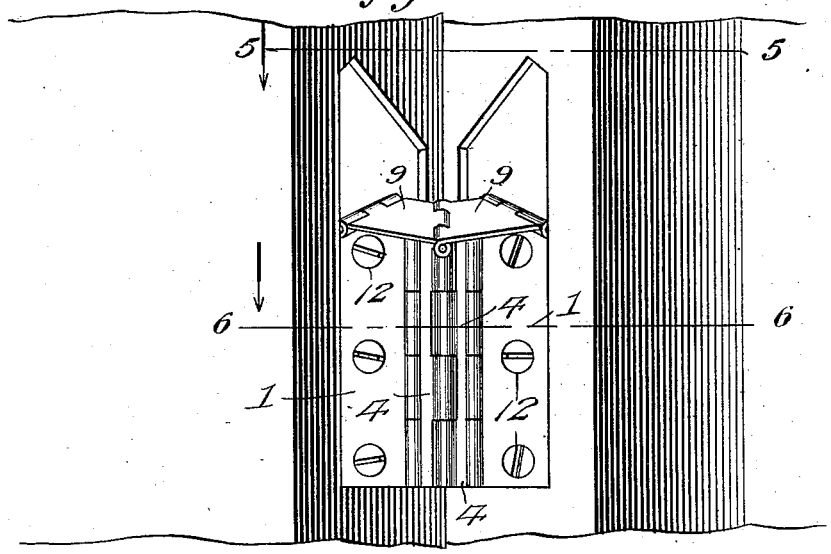
Figure 5:
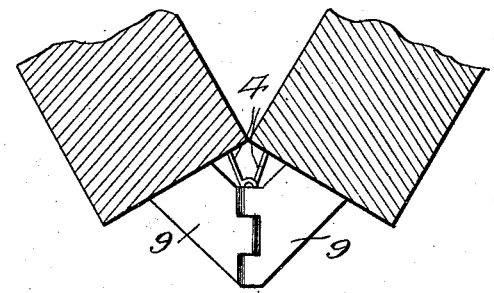
Figure 6:
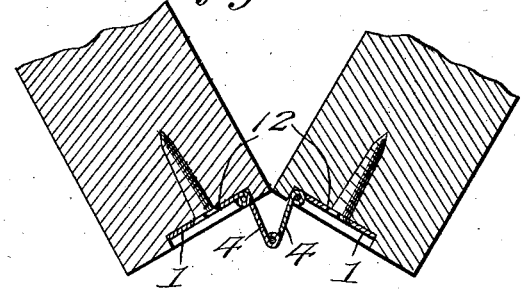

With the above and other objects in view, the invention consists in the construction, combination and arrangement of parts hereinafter fully described, claimed and illustrated in the accompanying drawings, wherein:

Figure 1 is a perspective view of a hinge constructed in accordance with my invention, the hinge being shown in opened position. Fig. 2 is a side elevation of the hinge when in closed position. Fig. 3 is an end view of the hinge when in closed position. Fig. 4 is a perspective view illustrating the application of the hinge. Fig. 5 is a horizontal section on the line 5—5 of Fig. 4, looking in the direction indicated by the arrow, and Fig. 6 is a similar view on the line 6—6 of Fig. 4, looking in the direction indicated by the arrow.

Referring to the drawings by reference numerals, 1 designates leaves, each of which is provided on one of its vertical edges with knuckles 2, and which are provided on their upper horizontal edges with knuckles 3. The leaves are pivotally connected together by auxiliary leaves 4, which are narrower than the leaves 1 and on their vertical edges with knuckles 5 and 6. The auxiliary leaves are connected to the leaves 1 by pintle pins 7 passing through the knuckles 2 and 5, and are connected together by a pintle pin 8 passing through the knuckles 6. The pivot 8 of the auxiliary leaves 4 is disposed inwardly between the leaves 1, and said pivot is the center of the circle in the arc of which the leaves 1 move during the opening and closing of the hinge. The opening movement of the hinge is limited by a brace which comprises two pivotally connected and curved sections 9. The sections 9 are provided on their angular edges with knuckles 10 and 11, and they are pivotally connected together by a pintle pin passing through the knuckles 11 and to the leaves 1 by pintle pins passing through the knuckles 3 and 10. The sections 9 are forced into a vertical position during the closing of the hinge and into an approximately horizontal position during the opening of the hinge.

In practice, the edges of the door and door jamb are recessed deep enough to receive the leaves 1 and the sections 9 when the door is closed, the leaves 1 being secured in position by screws passing through openings 12 therein. During the opening movement of the door, the pivot 8 of the auxiliary leaves 4 moves in a direction away from the normally stationary leaf 1 and the sections 9 of the brace are separated and moved downwardly. When the door is fully opened, the sections 9 occupy an approximately horizontal position. When the door is being closed, the pivot 8 moves in a direction towards the normally stationary leaf 1, thus throwing strain upon the inner meeting edges of the sections 9 in the direction of their pivot 11, which strain causes the sections to break at their pivot in an upward direction and permits the door to be closed.

In view of the fact that the sections 9 assume an approximately horizontal position when the door is open, they limit the opening movement of the door and thus prevent the door knob from engaging and disfiguring a wall, and they may also support a horizontal hinged door in opened position.

Having fully described and illustrated my invention, what I claim is:

1. The combination with a hinge having the leaves thereof united by pivotally connected auxiliary leaves, of a brace comprising sections pivotally connected together and to the upper edges of the leaves of the hinge, said sections being adapted to occupy an approximately horizontal position when the hinge is open, the pivot of the auxiliary leaves being adapted to move in the direction of the normally stationary leaf of the hinge when the hinge is being closed, thus throwing strain upon the inner meeting edges of the sections in the direction of their pivot, which strain causes the sections to break at their pivot in an upward direction and permits the hinge to be closed.

2. The combination with a hinge having the leaves thereof united by pivotally connected auxiliary leaves, of a brace comprising curved sections pivotally connected together and to the upper edges of the leaves of the hinge at their inclined edges, said sections being adapted to occupy an approximately horizontal position when the hinge is opened, the pivot of the auxiliary leaves being adapted to move in the direction of the normally stationary leaf of the hinge when the hinge is being closed, thus throwing strain upon the meeting edges of the sections in the direction of their pivot, which strain causes the sections to break at their pivot in an upward direction and permits the hinge to be closed.

In testimony whereof, I affix my signature in presence of two witnesses.

SAMUEL REDPATH HEWITT.

Witnesses:
EDWARD HARVEY,
PAUL KNABENSHUE.